United States Patent
Rich et al.

(10) Patent No.: US 9,673,494 B2
(45) Date of Patent: Jun. 6, 2017

(54) PORTABLE ELECTRONIC DEVICE THERMAL MANAGEMENT SYSTEM

(71) Applicant: GRAFTECH INTERNATIONAL HOLDINGS INC., Parma, OH (US)

(72) Inventors: David G. Rich, Middleburg Heights, OH (US); Robert A. Reynolds, III, Bay Village, OH (US); Bret Alan Trimmer, Middlefield, OH (US)

(73) Assignee: Advanced Energy Technologies LLC, Lakewood, OH (US)

( * ) Notice: Subject to any disclaimer, the term of this patent is extended or adjusted under 35 U.S.C. 154(b) by 0 days.

(21) Appl. No.: 14/771,299

(22) PCT Filed: Feb. 27, 2014

(86) PCT No.: PCT/US2014/018945
§ 371 (c)(1),
(2) Date: Aug. 28, 2015

(87) PCT Pub. No.: WO2014/163926
PCT Pub. Date: Oct. 9, 2014

(65) Prior Publication Data
US 2016/0013527 A1    Jan. 14, 2016

Related U.S. Application Data

(60) Provisional application No. 61/777,612, filed on Mar. 12, 2013.

(51) Int. Cl.
*H01M 10/655* (2014.01)
*H01M 10/6551* (2014.01)
(Continued)

(52) U.S. Cl.
CPC ..... *H01M 10/6551* (2015.04); *H01M 2/1066* (2013.01); *H01M 10/617* (2015.04);
(Continued)

(58) Field of Classification Search
CPC .................................................. H01M 10/666
See application file for complete search history.

(56) References Cited

U.S. PATENT DOCUMENTS 7,965,514 B2    6/2011    Hill et al.
8,477,499 B2    7/2013    Hill et al.
(Continued)

FOREIGN PATENT DOCUMENTS

WO    2011146919    11/2011

OTHER PUBLICATIONS

The International Preliminary Report on Patentability of PCT/US2014/018945 dated Sep. 24, 2015.
(Continued)

*Primary Examiner* — Jacobs Marks (57) ABSTRACT

An electronic device having a heat source disposed in direct alignment with a battery for the device and a thermal management system in thermal contact with the heat source. The thermal management system may extend from at least a first surface of the battery to a second surface of the battery. The second surface of the battery may be adjacent a heat dissipation element. The thermal management system may further be in thermal contact with the heat dissipation element. Further a portion of the thermal management system extends along the first and second surfaces of the battery and has a sufficiently high anisotropic ratio to avoid the transfer of heat to the battery to the extent to inhibit the functioning of the battery.

15 Claims, 5 Drawing Sheets

(51) Int. Cl.
*H01M 10/623* (2014.01)
*H01M 10/6554* (2014.01)
*H01M 10/617* (2014.01)
*H01M 2/10* (2006.01)

(52) U.S. Cl.
CPC ....... *H01M 10/623* (2015.04); *H01M 10/655* (2015.04); *H01M 10/6554* (2015.04)

(56) References Cited

U.S. PATENT DOCUMENTS

| | | |
|---|---|---|
| 2006/0083984 A1 | 4/2006 | Oh et al. |
| 2006/0126304 A1 | 6/2006 | Smalc et al. |
| 2008/0085389 A1* | 4/2008 | Norley .................. H01J 9/241 428/40.1 |
| 2009/0061191 A1 | 3/2009 | Zhamu et al. |
| 2011/0039143 A1* | 2/2011 | Bacon .................. H01R 31/06 429/100 |
| 2011/0165379 A1 | 7/2011 | Ohta et al. |
| 2011/0236741 A1* | 9/2011 | Chew .................. B60L 11/1879 429/120 |
| 2012/0034502 A1* | 2/2012 | Nieh .................. H01M 10/0436 429/62 |
| 2012/0140419 A1* | 6/2012 | Ribas .................. H05K 7/20454 361/714 |
| 2012/0288736 A1* | 11/2012 | Kim .................. H01M 2/0207 429/10 |
| 2012/0308874 A1* | 12/2012 | Ootani .................. H01M 10/052 429/159 |
| 2013/0115506 A1 | 5/2013 | Wayne et al. |
| 2013/0136966 A1 | 5/2013 | Bhardwaj et al. |
| 2013/0344369 A1 | 12/2013 | Miyakawa et al. |

OTHER PUBLICATIONS

International Search Report and Written Opinion of PCT/US2014/018945 dated Jun. 5, 2014, 10 pages.
Supplementary European Search Report from corresponding EP Application No. EP 14778515, Dated Dec. 10, 2016.

* cited by examiner

PORTABLE ELECTRONIC DEVICE THERMAL MANAGEMENT SYSTEM

RELATED APPLICATIONS

This application is the U.S. National Phase under 35 U.S.C. §371 of International Application No. PCT/US2014/018945, filed on Feb. 27, 2014, which claims the benefit of U.S. Provisional Application 61/777,612 filed Mar. 12, 2013, with the title of Portable Electronic Device Thermal Management System, the disclosures of which Applications are incorporated herein in their entirety by reference.

TECHNICAL FIELD

The disclosed embodiments relate to a thermal management system for portable electronic devices, particularly for a device which includes a contemporary generation battery or a next generation battery.

TECHNICAL BACKGROUND

Ever since the invention of the portable transistor radio, there has been an interest in portable, now known as "mobile", electronic devices. This interest started with AM radios which people could carry and was continued with cameras and a combination cassette tape player-radio, e.g., the Walkman® radio, and now includes devices such as cameras, mobile telephones, mobile computers, tablets, MP-3 players and other devices.

As the portable/mobile devices evolved over the decades so have the demands and capabilities of such devices. With each generation of devices, the devices have been able to provide more content to their users at ever higher bandwidths and in more user friendly formats, as well as giving users the ability to create, modify and deliver content from their devices. As the convenience of these devices increased so did the power requirements for the devices as well as the technology associated with the battery for such devices. These latter generation devices contained more energy and generated greater power and consequently generated more heat. In addition to the batteries, the hardware items e.g., radios, displays and processing units, of the devices also became more powerful and likewise created additional thermal issues for such devices.

Further, as these devices have become more powerful, the trend for these devices has favored smaller, lighter and thinner, and with greater density of components inside the devices or otherwise configured so that the space available inside the casing of the device is minimized With the combination of increased power of the components inside the device and reduced internal space, thermal management of the system is a factor designers of mobile devices should take into account and has become a major consideration, and in some cases a limiting factor, to nearly all aspects of the design of high-powered, portable devices.

BRIEF DESCRIPTION

The embodiments disclosed herein include an electronic device having a heat source disposed in direct alignment with a battery for the device and a thermal management system in thermal contact with the heat source. The thermal management system may extend from at least a first surface of the battery to a second surface of the battery. The second surface of the battery may be optionally adjacent a heat dissipation element, e.g., a heat sink, a heat pipe, a cold plate, etc. The thermal management system may further be in thermal contact with the heat dissipation element. Further a portion of the thermal management system may extend along the first and second surfaces of the battery having a sufficiently high spreading coefficient and be in thermal communication with a plurality of cells in the battery to avoid the formation of a localized hot spot in anyone of the cells. In an alternative embodiment, the electronic device does not include such heat dissipation device.

It is to be understood that both the foregoing general description and the following detailed description provide embodiments of the disclosure and are intended to provide an overview or framework of understanding to nature and character of the invention as it is claimed.

DETAILED DISCLOSURE

The embodiments disclosed herein have application to various mobile devices such as but not limited to cellular telephones commonly referred to as "smartphones", notebook computers, netbooks, ultra-books, laptops, tablets, MP-3 players, and cameras. These types of devices may be generically referred to as mobile devices.

It has come to light that as the components included in such mobile devices such as but not limited to the battery, the central processing unit "CPU", the graphical processing unit "GPU", the drive chip, the memory chip, RF power amplifiers and transceivers, DC/DC switchers for any or all onboard radio or cellular types (CDMA, GSM, WCDMA/UMTS, and LTE, plus their data equivalents: Wi-Fi, BT, GPS, NFC, EV-DO; EDGE, GPRS, HSDPA, HSUPA VOIP), PMIC (Power Management Integrated Circuit) such as buck and/or boost inductors and power converters, and/or wireless charging elements, high speed digital electronics (such as cameras image processing and stabilizing elements, still or video image lighting sources), display elements (LEDs, OLEDs and their drivers), disk drives (such as CD/DVD/Blue-Ray drives) and high-speed USB ports or other ports used for high-power applications such as used for charging or operating peripherals have become more powerful, the heat generated inside the device has also increased. The aforementioned components are examples of a heat source.

Additional heat generated can have various detrimental effects on the device. For example, in the case of a battery, the application of an undesirable amount of heat to the battery can lead to various failure mechanisms in the battery such as altering the chemical reactions generated. Excessive battery heating by external components may also lead to decreases in the number of cycles the battery can complete during its useful life, and may expedite and increase the swelling of the battery, further reducing its performance and acceptability for the device. In the worst cases, excessive battery heating can increase the preference for undesirable non-reversible reactions; which can lead to the destruction of the battery.

The concerns for excessive heat exposure of the battery have led to fewer device design and layout options in the last three (3) to five (5) years. Contemporary devices, with the greater capabilities, do not place the battery and PCB in an overlapping vertical configuration, often referred to as "battery-over-PCB" orientation which may have been used prior to the introduction of 3G mobile communication technology.

With respect to other types of components included in the electronic device, the application of the undesirable heat can lead to a reduction in the functioning frequency of the component and consequently a reduction in the responsiveness of the overall device, thereby degrading the perceived performance of the device. A further example of a detrimental application of heat may lead to a reduction in the overall quality of the image on the display of the device.

Figure 1:
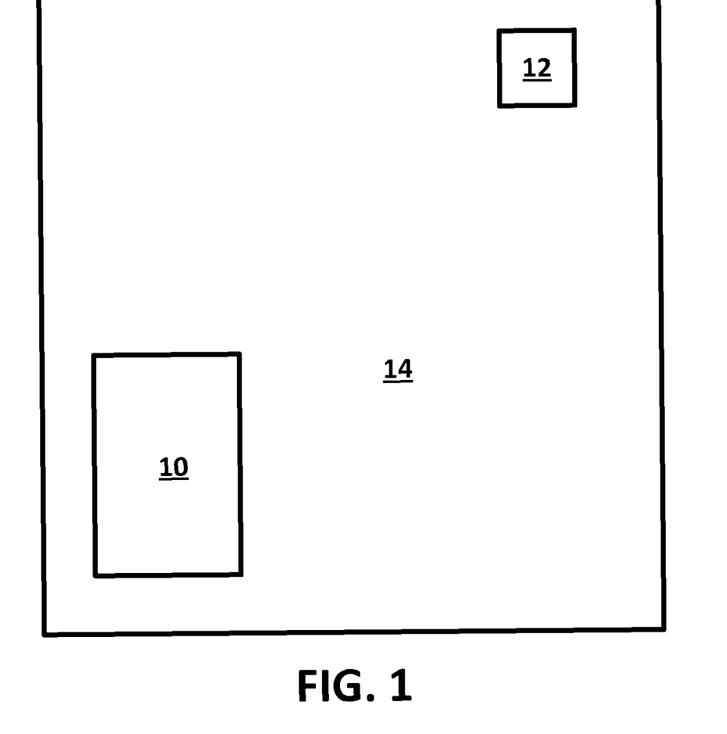
FIG. 1 is elevated top view of a conventional configuration of a PCB and a battery.
Figure 2:
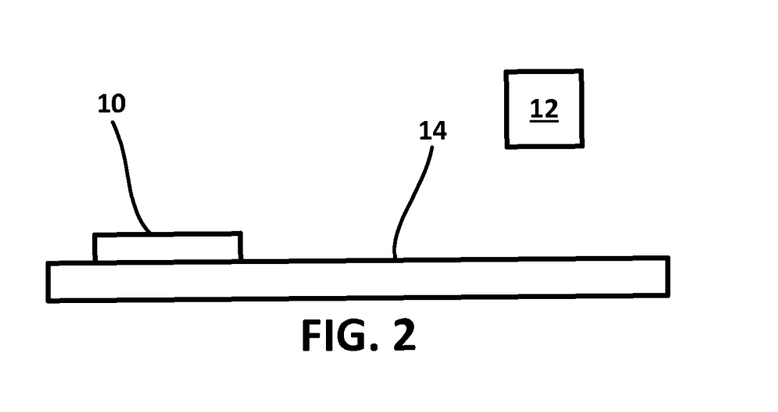
FIG. 2 is a side view of the conventional configuration shown in FIG. 1.

A prior attempt to address the issues of the transmission of an undesirable amount of heat from a component of an electronic device to another component was to space the desired components vertically and horizontally apart from one another or "offset", such that for example the battery was not vertically in alignment with a CPU or other component which may generate an undesirable amount of heat and transfer such heat to the battery. An exemplary prior art device arrangement may be shown with reference to FIG. 1 which is a top elevated partial view and FIG. 2 which is a side partial view. As can be seen a battery 10 and a heat source 12 are arranged inside an electronic device relative to a device housing 14. The battery 10 may be located in a left side lower section of the device and the heat source 12 (e.g. a CPU) may be located in a right side upper section of the device. Thus, as illustrated in FIGS. 1 and 2, battery 10 is both vertically and horizontally offset from heat source 12.

Disclosed herein are embodiments in which the two electronic components may be located in direct thermal alignment, such as horizontal or vertical to each other. By way of the example, each of the battery and the CPU may be located in either of the upper right side of the device, lower left side of the device or any other desired area of the device. In another embodiment, the battery and the CPU may be horizontally side by side. An embodiment disclosed herein includes an electronic device having a heat source disposed in vertical alignment with a battery for the device. Vertical alignment is used in the previous sentence to mean the battery and the heat source is not offset from one another within the device in the vertical direction.

Figure 3:
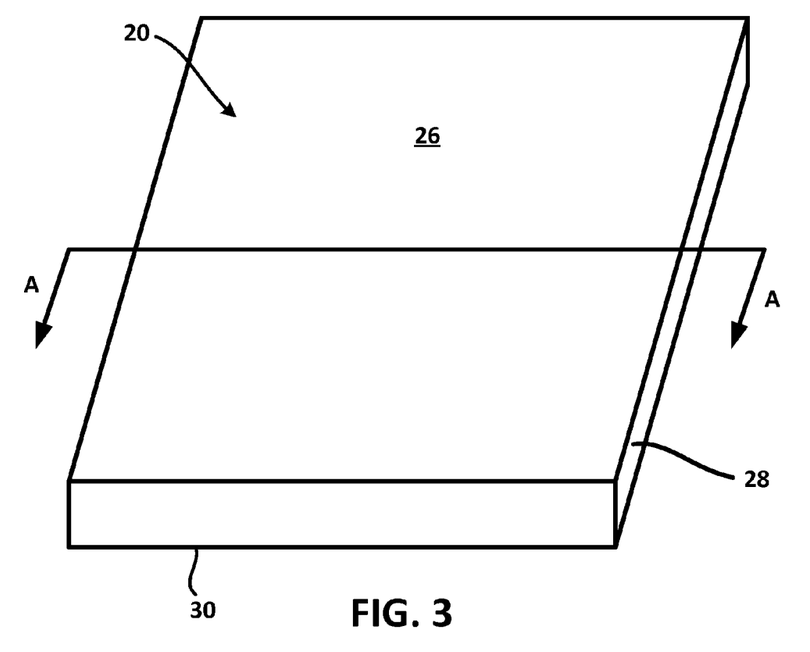
FIG. 3 is a perspective elevated view of a battery and thermal management system according to the disclosure.
Figure 4:
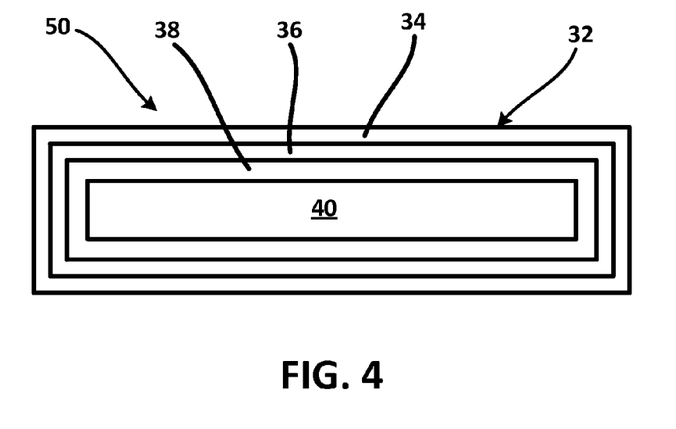
FIG. 4 is a section view taken along line A-A of FIG. 3.

A thermal management system may extend from at least a first surface of a battery and optionally to a second surface of a battery. With reference to FIGS. 3 and 4, in one embodiment, a first surface may be a top surface 26 of a generally rectangular battery 20 and second surface may be a side surface 28 of the generally rectangular battery 20. In another embodiment, the first surface may be a top surface 26 of the generally rectangular battery 20 and the second surface may be an opposed bottom surface 30 of the generally rectangular battery 20. In still further embodiments, the first and second surfaces may be any two surfaces that are on generally opposed sides of a battery (whether rectangular, pouch shaped, or cylindrical). In still other embodiments the first surface and second surface may be any two adjoining surfaces, for example a top surface and a side surface. Alternatively the system may completely wrap around the battery, for example, the system may wrap around the top 26, sides 28 and bottom 30 of the generally rectangular battery 20. In other embodiments, the system may wrap around the entire circumference of a cylindrical battery. Further, alternatively, the thermal system may substantially encompass the entire battery and thereby include only openings required for electrical connections and/or to ensure proper venting.

The device further includes that the thermal management system is in thermal contact with the heat source. When arranged in a device, the second surface of the battery may be adjacent an optional heat dissipation element and the first surface may be adjacent the heat source. Exemplary heat dissipation elements include heat sinks, heat pipes, cold plates, etc. In this manner, heat may be directed around the battery from the heat source to the heat dissipation element. The heat dissipation element may be spaced apart from the case of the device; such case includes an exterior surface of the device. Thermal contact is defined herein to include at least the heat source transmits heat to the thermal management system. Further a portion of the thermal management system extending along the first and second surfaces of the battery may have a sufficiently high spreading coefficient and being in thermal communication with a plurality of the battery cells of the battery to avoid the transfer of heat to the battery which would create a localized hot spot in a particular cell of the battery. Such localized hot spot will lead to inhibiting the functioning of the battery. An a example of a localized hot spot, one cell is not more than 10° C. hotter than its adjacent cell(s). In another example of a localized hot spot, one cell is not more than 5° C. hotter than its adjacent cell(s). Examples of unwanted heat which are prohibited from reaching the battery include that amount of heat which would: adjust the battery chemistry that non-reversible reactions were incurring at an undesirable frequency; raise the temperature of the battery above a threshold such that the rate at which the battery either charges or discharges electricity is reduced to an undesirable level; or the battery reaches a temperature which unduly reduces the battery cycle life. Further it is preferable that the amount of heat which is transmitted to the battery is acceptable to the battery technology, specifications and operating conditions in all cases, including safety tolerance under failing conditions.

In many instances the conditions may occur in a particular cell of the battery and lead to the premature failure of that particular cell. This can have a domino effect on other cells in the battery, leading to the undesirable performance by the battery. A localized hot spot formed in the initial cell can be a cause of the premature failure of such initial cell. The thermal management system may balance the heat across a plurality of cells which make up the battery, thereby eliminating the hot spot in the initial cell.

Examples of the types of batteries that may be applicable to the above embodiment include a nickel-cadmium battery, lithium ion battery or a lithium polymer battery. The above embodiments may likewise be applicable to next generation batteries also. Additionally, the above embodiments are applicable to either removable batteries or non-removable batteries. The removable battery is capable of being removed from the device without damaging the electronic device and/or any of the other components included in the device.

Preferably neither of the battery or the thermal management system is in contact with the external surface of the device. Preferably there is an air gap between the battery and the external surface of the device. Also it is preferred that the thermal management system does not extend to the external surface of the device. It is further preferred that the thermal management system is not in thermal communication with the external surface of the device.

Exemplary embodiments of the heat dissipation element may include one or more selected from the group of an internal frame or chassis for the device, a cold plate, a heat pipe or a heat sink. Any of the mentioned heat dissipation elements may be constructed from a suitable plastic, metal, or other suitable material or combinations thereof.

In a particular embodiment the portion of the thermal management system extending around the battery includes a sheet of flexible graphite. Advantageously, the flexible graphite sheet in the thermal management system is a contiguous sheet. In one embodiment, the flexible graphite is a sheet of compressed particles of exfoliated graphite. Preferably the anisotropic ratio of the sheet of flexible graphite is greater than at least about 40, other examples of suitable anisotropic ratios include at least about 75, at least about 100, and at least about 150. Anisotropic ratio is used herein to mean the in-plane thermal conductivity divided by the thru-plane thermal conductivity. GrafTech International Holdings Inc. eGraf® heat spreader solutions is an example of the aforementioned sheets of compressed particles of exfoliated graphite. Another example of a flexible graphite sheet is eGraf® SS1500 heat spreader, which is a graphitized polyimide.

For an example of how such sheets of exfoliated graphite may be made U.S. Pat. No. 3,404,061 is incorporated herein its entirety. Exemplary thicknesses of the sheet include at least about 40 microns, at least about 50 micron, at least about 100 microns, at least about 250 microns. As for the thickness, there is no limit to the acceptable thickness in which the sheet can be formed and wrapped around the battery. However given the trends in electronic devices, it is difficult to envision that such a device would be designed to accommodate a sheet which is more than 2 mm thick. An example of how a graphitized polyimide sheet can be made is U.S. Pat. No. 5,091,025 which is incorporated herein by reference in its entirety.

In terms of through thermal impedance, it is advantageous if the graphite sheet has a through thermal impedance of at least 0.25 $cm^2K/W$, preferably at least 0.30 $cm^2K/W$, more preferably at least 0.40 $cm^2K/W$, and even more preferred at least 0.50 $cm^2K/W$. The thermal impedance is a measure of materials resistance to transfer heat through the body of the material. This is determined by multiplying the through plane thermal conductivity times the thickness of the graphite sheet.

As for the heat spreading coefficient of the portion, a preferred spreading coefficient is at least 0.040 W/K, more preferred at least 0.050 W/K, and even more preferred at least 0.060 W/K. The spreading coefficient is a measure of how well a material balances the heat it is exposed to across its surface. The spreading coefficient can be determined by multiplying the in-plane thermal conductivity of the flexible graphite sheet which makes up the portion by its thickness. The flexible graphite sheet which comprises the portion, may extend throughout the majority of the thermal management system; further substantially all of the thermal management system.

In another alternative embodiment, the flexible graphite is a sheet of graphitized polyimide resin and a polymeric layer, the polymeric layer having a through-plane thermal conductivity of less than about 1 W/mK and a thickness of at least about 10 microns. Though not required the graphitized polyimide most likely has a thickness of less than about 70 microns. An example of the graphitized polyimide product includes GrafTech International Holdings Inc. eGraf® SS1500 solution.

Either one of the aforementioned graphite sheets when used in the thermal management system are preferably devoid of an elastomer in the sheet. One or both of the major surfaces of the sheet may or may not be coated with a protective layer, typically a thermoplastic polymeric layer, such as a PET film. Also, it is possible that a major surface of the graphite sheet not coated with the protective layer directly on such surface has an adhesive layer on such major surface.

Optionally the thermal management system may further include a second portion in thermal communication with the battery. The second portion may be located on the battery at a desired location to dissipate heat from the battery. For example the second portion may be located at a known or perceived hot spot on the exterior of the battery. Such a second portion may be a thermal interface material, a heat spreader or other type of heat dissipating device. The second portion may also be in contact with the heat dissipation element or a second heat dissipation element.

Another optional embodiment may include a thermally insulating material, a dielectric material, or a shock absorbing material disposed between at least the second surface of the battery and the portion of the thermal management system extending along the second surface of the battery. In a certain advantageous embodiment the thermally insulating material, a dielectric material, or a shock absorbing material is disposed along both the first and second surfaces of the battery. In an additionally advantageous embodiment the thermally insulating material, a dielectric material, or a shock absorbing material is disposed along substantially all of the battery which the portion of the thermal management system is disposed along. Examples of such material include various nonconductive polymeric films and foams.

With reference now to FIG. 4, the above embodiments are further described. As can be seen, battery assembly 50 includes a thermal management system 32 encompassing battery 40. In the embodiment disclosed in FIG. 4, system 32 includes an outer polymeric layer 34, a layer including a sheet of flexible graphite 36 of either compressed particles of exfoliated graphite or graphitized polyimide positioned inwardly of outer polymeric layer 34, and an inner polymeric layer 38 positioned closest to the battery cell 40. Thus, as can be seen, according to this embodiment, the flexible graphite layer 36 is positioned between outer polymeric layer 34 and inner polymeric layer 38. It should be appreciated that, polymeric layers 34 and 38 may alternately or in addition be a dielectric material or a shock absorbing material. Further, the inner polymeric layer 38 may also function as the outer containment layer of the battery cell 40 that contains the electrochemical components therein. Additionally, outer polymeric layer 34 may function as an attachment point or printing surface for a product label.

Figure 5:
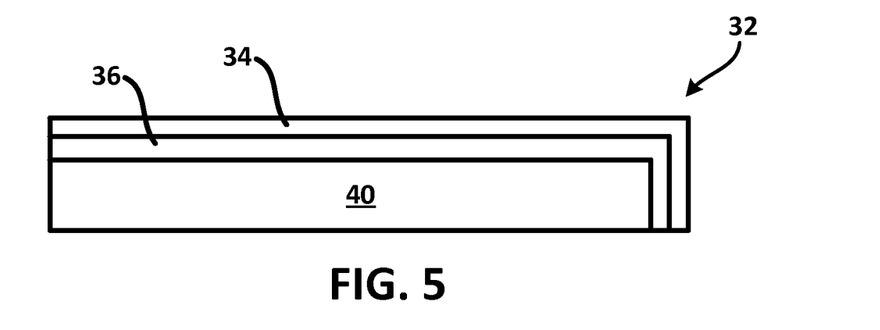
FIG. 5 is a section view of an alternate exemplary embodiment of the thermal management system.
Figure 6:
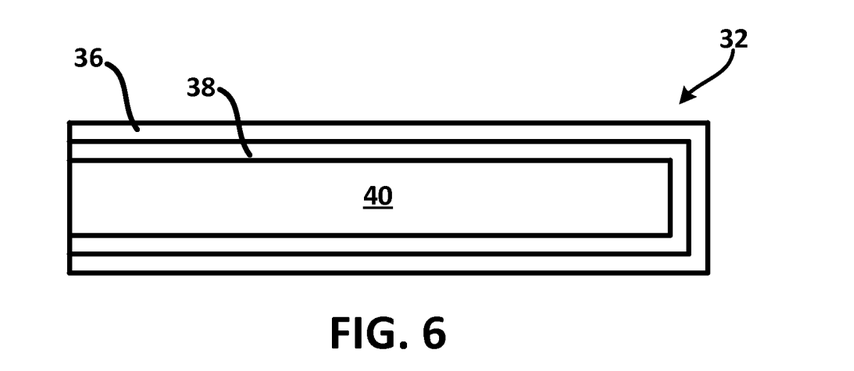
FIG. 6 is a section view of an alternate exemplary embodiment of the thermal management system.
Figure 7:
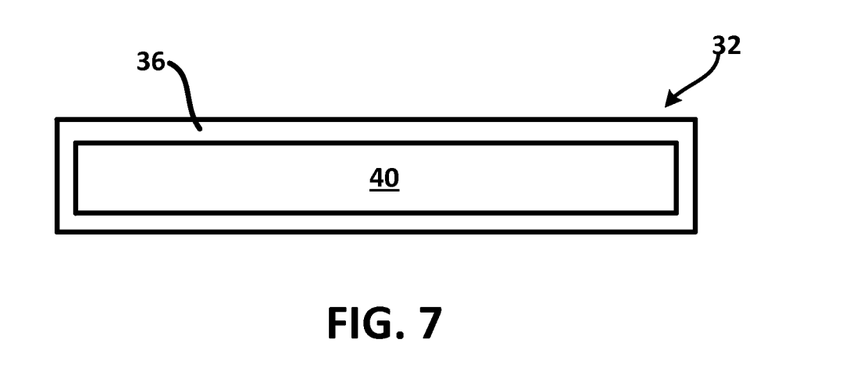
FIG. 7 is a section view of an alternate exemplary embodiment of the thermal management system.

As disclosed herein above, the polymeric/insulative/dielectric layers are optional and likewise, complete enclosure of the battery is likewise optional. Thus, with reference now to FIGS. 5-7, a variety of further exemplary embodiments are disclosed. As can be seen in FIG. 5, thermal management system 32 includes an outer polymeric layer 34 and a flexible graphite layer 36. Further, the polymeric layer 34 and the flexible graphite layer 36 engage only a first and a second side of battery cell 40. As can be seen in FIG. 6, the thermal management system 32 includes a flexible graphite layer 36 and an inner polymeric layer 38. The thermal management system encompasses more than two sides but not the entire battery cell 40. A further exemplary embodiment is shown in FIG. 7, wherein the thermal management system 32 includes the flexible graphite layer 36 encompassing the entire battery cell 40.

Figure 8:
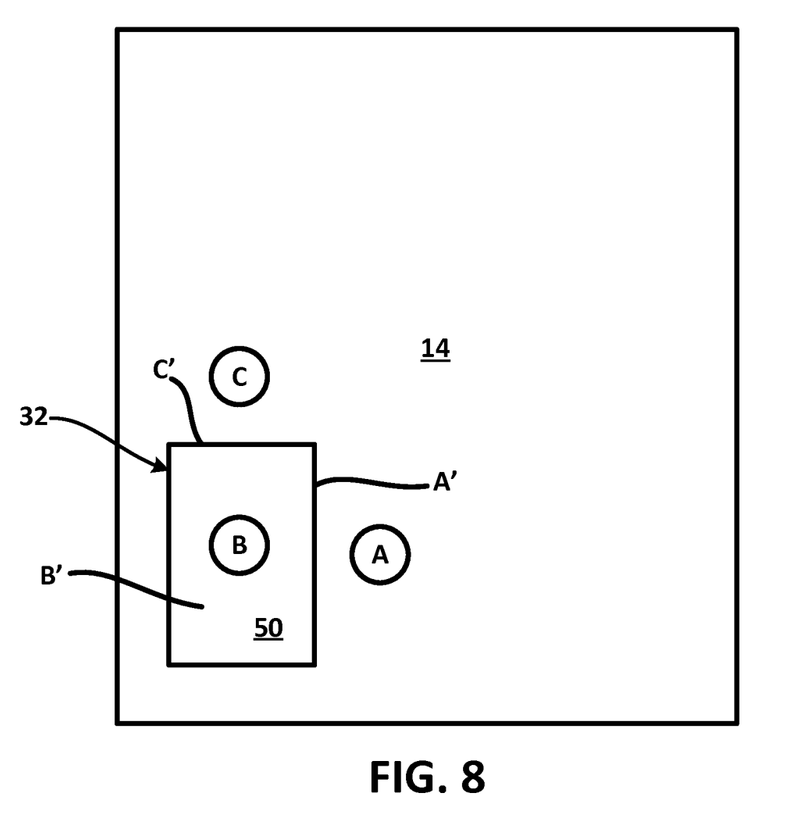
FIG. 8 is an elevated top view of the internal configuration of a device including a battery having a thermal management system and one or more heat sources.
Figure 9:
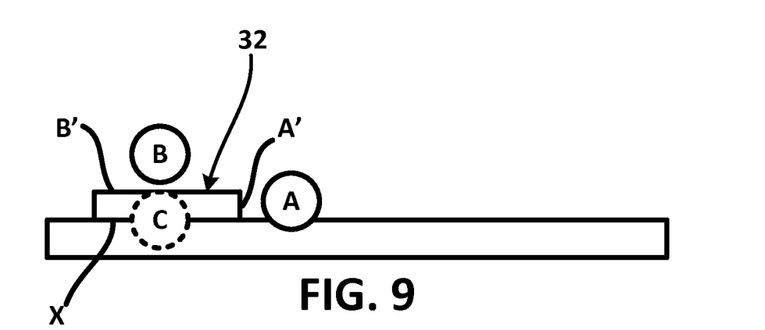
FIG. 9 is a side view of the device of FIG. 8.

With reference now to FIGS. 8-9, in light of the above description, the heat source may be located in direct alignment with the battery assembly 50 including thermal management system 32 at any one of positions A, B or C. Positions A, B and C are only exemplary locations for the heat source and should not be used to limit the claims included herein. A heat source in any of these locations may be in thermal contact with thermal management system. Thus, for example, if the device included heat source A, according to the above disclosure, surface A' is the first surface in thermal contact with the heat source and surface X may be the second surface of the battery adjacent the heat dissipation element (the exterior surface 14 of the device). Stated another way the first surface of thermal management system 32 in thermal contact with heat source A may be referred to as a first portion or portion of thermal management system 32, this same nomenclature can also be used with any and all of the other embodiments described herein. Likewise, if the device included heat source B, according to the above disclosure, surface B' is the first surface in thermal contact with the heat source and surface X may be the second surface. Further, if the device included heat source C, then surface C' would be the first surface in thermal contact and surface X may be the second surface.

Figure 10:
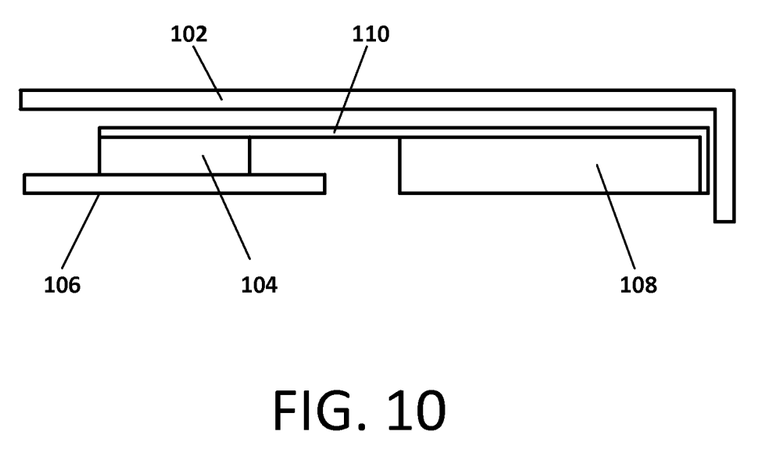
FIG. 10 is a side view of an embodiment disclosed herein.

Illustrated in FIG. 10 is a further embodiment, designated 100. As shown the device 100 includes an external surface 102. Inside the device are a heat source 104 and a printed circuit board 106. Also shown is a battery 108 adjacent and in thermal communication with source 104. The thermal management system 110 is in thermal communication with heat source 104 and a first side and a second side of battery 108. Additionally shown is an air gap between battery 108 and external surface 102 as well as between system 110 and external surface 102. An exemplary embodiment of system 110 is a heat spreader comprising eGraf SS400 heat spreader (available from GrafTech, Parma, Ohio). Other embodiments of system 110 may include combinations of one GrafTech's eGraf® heat spreaders and GrafTech's HiTherm thermal interface material.

In another particular embodiment, the thermal management system may be in physical contact with both the heat source and the battery.

In a certain embodiment, the portion may comprise at least a portion of a label for the battery. In a particular embodiment, the portion of the thermal management system may be incorporated into a label for the battery. The label of the battery may function to provide informational or marking purposes, electrical isolation benefits, and at least some amount of structural support.

The embodiments disclosed herein may be used to maintain the battery temperature within a desired range to prevent negative effects to the battery, preferably the battery is maintained at a temperature below 95° C., more preferably less than about 80° C., even more preferably less than about 70° C. and even more further preferred less than about 60° C.

The embodiments disclosed herein may be used to enable the desirable device design of battery over PCB. Another advantage of the embodiments disclosed herein include the reduction in the effect hot components may have on battery, especially if the hot component is adjacent the battery. This will help prevent localized heat build-up ("hot spot") on the battery from external sources, thereby better enabling any thermal management needs of the battery to only the heat generated by the battery. Also the likelihood of any undesirable reaction caused by external heating is lessened. Further swelling of the battery which could be caused by localized external heating of the battery is inhibited. Additionally with respect to the operation of the battery, the embodiments disclosed herein may provide superior safety margin from thermal runaway caused by heating from failing components, such as when they are shorted or latched-up. Devices which incorporate an embodiment disclosed herein may have cheaper, slimmer and/or more efficient designs. The battery of devices which incorporates one of the embodiments disclosed herein will be less susceptible to the formation of localized hot spots. Additionally, the batteries should exhibit a more uniform temperature profile. Further, heated directed toward the battery will be more evenly spread across that part of the battery in thermal communication with the thermal management system.

The electronic device may not have an EMI shield around either or both of the heat source or the battery. In one particular embodiment, any EMI shield included in the device is not part of the thermal management system.

It is preferred though not required, that one or more of the embodiments disclosed herein enables the device to meet relevant electromagnetic compatibility standards such as IEC standard 60601-1-2.

The above description is intended to enable the person skilled in the art to practice the invention. It is not intended to detail all the possible variations and modifications that will become apparent to the skilled worker upon reading the description. It is intended, however, that all such modifications and variations be included within the scope of the invention that is defined by the following claims.

Thus, although there have been described particular embodiments disclosed herein it is not intended that such references be construed as limitations upon the scope of this invention except as set forth in the following claims. The various embodiments discussed above may be practiced in any combination thereof.

What is claimed is:

1. An electronic device comprising:
    a battery having a plurality of cells, the battery having a first surface and a second surface;
    a heat source disposed in direct alignment with the battery, wherein the heat source is not a battery;
    a thermal management system in thermal contact with the heat source,
        the thermal management system extending to at least the first surface of the battery, the thermal management system having a portion extending along the first surface and the second surface of the battery, the portion being in thermal communication with the plurality of cells of the battery and the portion having a sufficiently high spreading coefficient to avoid the creation of a localized, hot spot in one of the cells to such magnitude to inhibit the function of the battery, wherein the battery and the system are spaced apart from the external surface of the device and devoid of a partition between the battery and the heat source.

2. The electronic device of claim 1 wherein the battery comprises at least one selected from a nickel-cadmium battery, a lithium ion battery or a lithium polymer battery and the beat source comprises an electronic component.

3. The electronic device of claim 2 wherein the second surface of the battery is adjacent a heat dissipation element.

4. The electronic device of claim 3 wherein the heat dissipation element comprises at least one of a frame and a chassis of the device.

5. The electronic device of claim 1 wherein the portion comprises a sheet of compressed particles of exfoliated graphite.

6. The electronic device of claim 1 wherein the battery is capable of being removed without damaging the device.

7. The electronic device of claim 1 wherein the thermal management system farther comprising a second portion in thermal communication with the battery located on the battery at a desired location to dissipate heat from the battery.

8. The electronic device of claim 7 wherein the second portion is in thermal contact with a heat dissipation element.

9. The electronic device of claim 1 further comprising one of a thermally insulating material and a dielectric material disposed between the battery and the portion.

10. The electronic device of claim 1 wherein the thermal management system is in physical contact with the heat source.

11. The electronic device of claim 1 wherein the portion comprises a sheet of graphitized polyimide resin and a polymeric layer, the polymeric layer having a through plane thermal conductivity of less than about 1 W/mK and a thickness of at least about 10 microns.

12. The electronic device of claim 1 wherein the portion comprises a sheet of compressed exfoliated graphite particles and a polymeric layer, the polymeric layer having a through-plane thermal conductivity of less than about 1 W/mK.

13. The electronic device of claim 1 wherein the portion comprises at least a part of a label for the battery.

14. The electronic device of claim 1 wherein the portion is incorporated into a label for the battery.

15. An electronic device comprising
   a. a heat source disposed in direct alignment with a battery for the device,
   b. a thermal management system in thermal contact with the heat source,
      i. the thermal management system extending to at least a first surface of the battery,
   c. a portion of the thermal management system extends along the first surface and a second surface of the battery, the portion being in thermal communication with a plurality of cells of the battery and having a spreading coefficient of at least 0.04 W/K, and
   d. the battery and the system are spaced apart from the external surface of the device and devoid of a partition between the battery and the system.

* * * * *